(12) United States Patent
Yotsuya et al.

(10) Patent No.: US 6,469,832 B2
(45) Date of Patent: Oct. 22, 2002

(54) METHOD FOR MANUFACTURING MICROLENS SUBSTRATE, MICROLENS SUBSTRATE, OPPOSING SUBSTRATE FOR LIQUID CRYSTAL PANEL, LIQUID CRYSTAL PANEL, AND PROJECTION DISPLAY APPARATUS

(75) Inventors: Shinichi Yotsuya, Chino; Nobuo Shimizu; Hideto Yamashita, both of Suwa, all of (JP)

(73) Assignee: Seiko Epson Corporation (JP)

( * ) Notice: Subject to any disclaimer, the term of this patent is extended or adjusted under 35 U.S.C. 154(b) by 37 days.

(21) Appl. No.: 09/748,083

(22) Filed: Dec. 22, 2000

(65) Prior Publication Data

US 2002/0021386 A1 Feb. 21, 2002

(30) Foreign Application Priority Data

Dec. 28, 1999 (JP) .......................................... 11-375314

(51) Int. Cl.$^7$ .......................... G02B 27/10; B29D 11/00
(52) U.S. Cl. ...................... 359/619; 359/620; 359/622; 264/1.32; 264/1.7; 216/26
(58) Field of Search ................................ 359/619, 620, 359/622; 264/1.32, 1.7; 216/26

(56) References Cited

U.S. PATENT DOCUMENTS 4,588,261 A * 5/1986 Erhardt ........................ 559/619
5,056,912 A * 10/1991 Hamada et al. ................ 353/38
5,715,022 A * 2/1998 Takamatsu et al. ......... 348/759
6,129,866 A * 10/2000 Hmanaka et al. ............. 264/1.7
6,336,406 B1 * 4/2002 Hamanaka et al. .......... 359/619
2001/0012596 A1 * 8/2001 Kunimoto et al. ........... 430/138
2002/0012088 A1 * 1/2002 Ozawa et al. ................ 349/123
2002/0021386 A1 * 2/2002 Yotsuya et al. ................ 349/95
2002/0027715 A1 * 3/2002 Shimizu et al. .............. 359/619

* cited by examiner

Primary Examiner—Georgia Epps
Assistant Examiner—David N. Spector
(74) Attorney, Agent, or Firm—Harness, Dickey & Pierce, P.L.C.

(57) ABSTRACT

A microlens substrate 1 includes a transparent substrate 2 provided with a plurality of concavities 3 having concave surfaces, an outer layer 8 bonded to the transparent substrate 2 at a surface thereof provided with the concavities 3 via a resin layer 9, and spacers 5 for regulating the thickness of the resin layer 9. The resin layer 9 includes microlenses 4 formed with a resin filling the concavities 3. The spacers 5 include globular particles. The standard deviation of particle-size distribution of the spacers 5 is preferably not greater than 20% of an average particle size of the spacers 5. The density of the spacers 5 is preferably in the order of 0.5 to 2.0 g/cm$^3$. A value $\rho 1/\rho 2$ is preferably in the order of 0.6 to 1.4, in which $\rho 1$ denotes the density (g/cm$^3$) of the spacers 5, and $\rho 2$ denotes the density (g/cm$^3$) of a resin forming the resin layer 9.

27 Claims, 9 Drawing Sheets

METHOD FOR MANUFACTURING MICROLENS SUBSTRATE, MICROLENS SUBSTRATE, OPPOSING SUBSTRATE FOR LIQUID CRYSTAL PANEL, LIQUID CRYSTAL PANEL, AND PROJECTION DISPLAY APPARATUS

FIELD OF THE INVENTION

The present invention relates to a method for manufacturing a microlens substrate, and to a microlens substrate, an opposing substrate for a liquid crystal panel, a liquid crystal panel, and a projection display apparatus.

DESCRIPTION OF THE RELATED ART

Hitherto, a projection display apparatus for projecting images on a screen has been known. In a projection display apparatus of this type, liquid crystal panels (liquid crystal optical shutters) are generally used for forming images.

A liquid crystal panel having such a configuration is known, which is provided with a number of minute microlenses in positions, each corresponding to a pixel of the liquid crystal panel. The microlenses are generally formed on a microlens substrate provided in the liquid crystal panel.

FIG. 9 is a schematic longitudinal-sectional view showing the configuration of a microlein; substrate used in the known liquid crystal panel.

As show n in the drawing, a microlens substrate 900 includes a glass substrate 902 provided with a number of concavities 903, and a glass layer 908 bonded to the glass substrate 902 via a resin layer 909 on a surface of the glass substrate 902 provided with the concavities 903. Microlenses 904 are formed in the resin layer 909 with a resin filling the concavities 903.

The microlens substrate 900 is formed in a process such that the resin before curing is supplied onto the glass substrate 902, the glass layer 908 is bonded to the glass substrate 902 via the resin, and the resin layer 909 is formed by curing the resin.

When the glass layer 908 is bonded to the glass substrate 902 in manufacturing the microlens substrate 900, the thickness of the resin layer 909 has been regulated by controlling the force and the time for pressing the glass layer 908 onto the glass substrate 902.

However, limitation of improving accuracy in regulating the thickness of the resin layer 909 by such a method has been noticed.

Accordingly, an object of the present invention is to provide a method for manufacturing a microlens substrate, and to provide a microlens substrate, an opposing substrate for a liquid crystal panel, a liquid crystal panel, and a projection display apparatus, in which the thickness of a resin layer can be regulated with high accuracy.

SUMMARY OF THE INVENTION

To the end, according to the present invention, a method for manufacturing a microlens substrate comprises the steps of supplying a resin onto a first substrate provided thereon with a plurality of concavities; bonding the first substrate to a second substrate via the resin; and forming microlenses with the resin filling the concavities. The first substrate and the second substrate are bonded to each other by providing a resin including a spacer outside a region in which the concavities are formed.

The resin forming the microlenses and the resin including the spacer preferably include the same material. The spacer may include particles or globular particles. The resin including the spacer may contain 1 to 50 percent by weight of the spacer. The second substrate may be made of glass.

A microlens substrate comprises a first substrate provided thereon with a plurality of concavities; a resin layer provided so as to cover the concavities, and microlenses formed with a resin filling the concavities. A spacer for regulating the thickness of the resin layer is provided outside an effective lens-region including the microlenses.

The spacer is preferably provided in the vicinity of an edge of the microlens substrate. The microlens substrate may be substantially quadrilateral and the spacer may be provided in the vicinity of at least three sides of the quadrilateral. The spacer may include particles or globular particles. The standard deviation of particle-size distribution of the spacer may be not greater than 20 percent of an average particle size of the spacer. The density of the spacer may be 0.5 to 2.0 g/cm$^3$. A value $\rho 1/\rho 2$ may be 0.6 to 1.4, in which $\rho 1$ denotes the density (g/cm$^3$) of the spacer and $\rho 2$ denotes the density (g/cm$^3$) of the resin forming the resin layer. An outer layer may be provided on the resin layer. The outer layer may be made of glass or ceramics.

DETAILED DESCRIPTION OF THE PREFERRED EMBODIMENTS

A microlens substrate according to the present invention includes a substrate and a wafer.

Preferred examples according to the present invention are described below in details with reference to the attached drawings.

Figure 1:
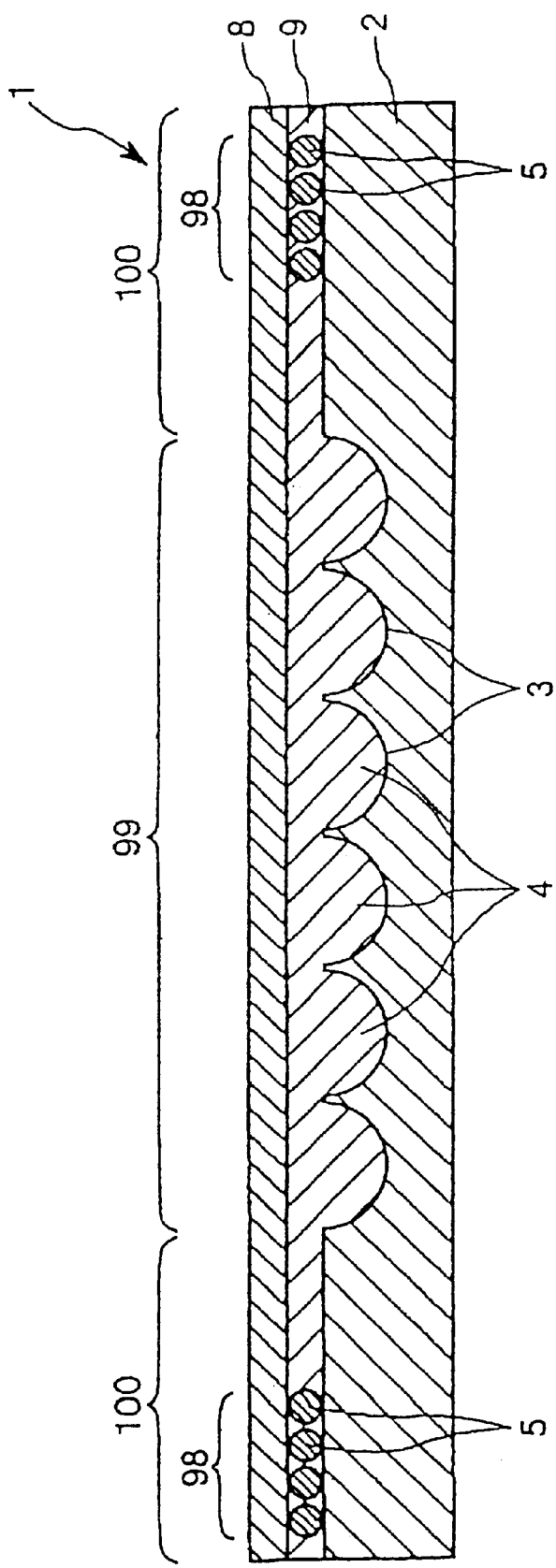
FIG. 1 is a schematic longitudinal-sectional view showing an example of a microlens substrate according to the present invention.

FIG. 1 is a schematic longitudinal-sectional view for describing an example of the microlens substrate according to the present invention.

Figure 2:
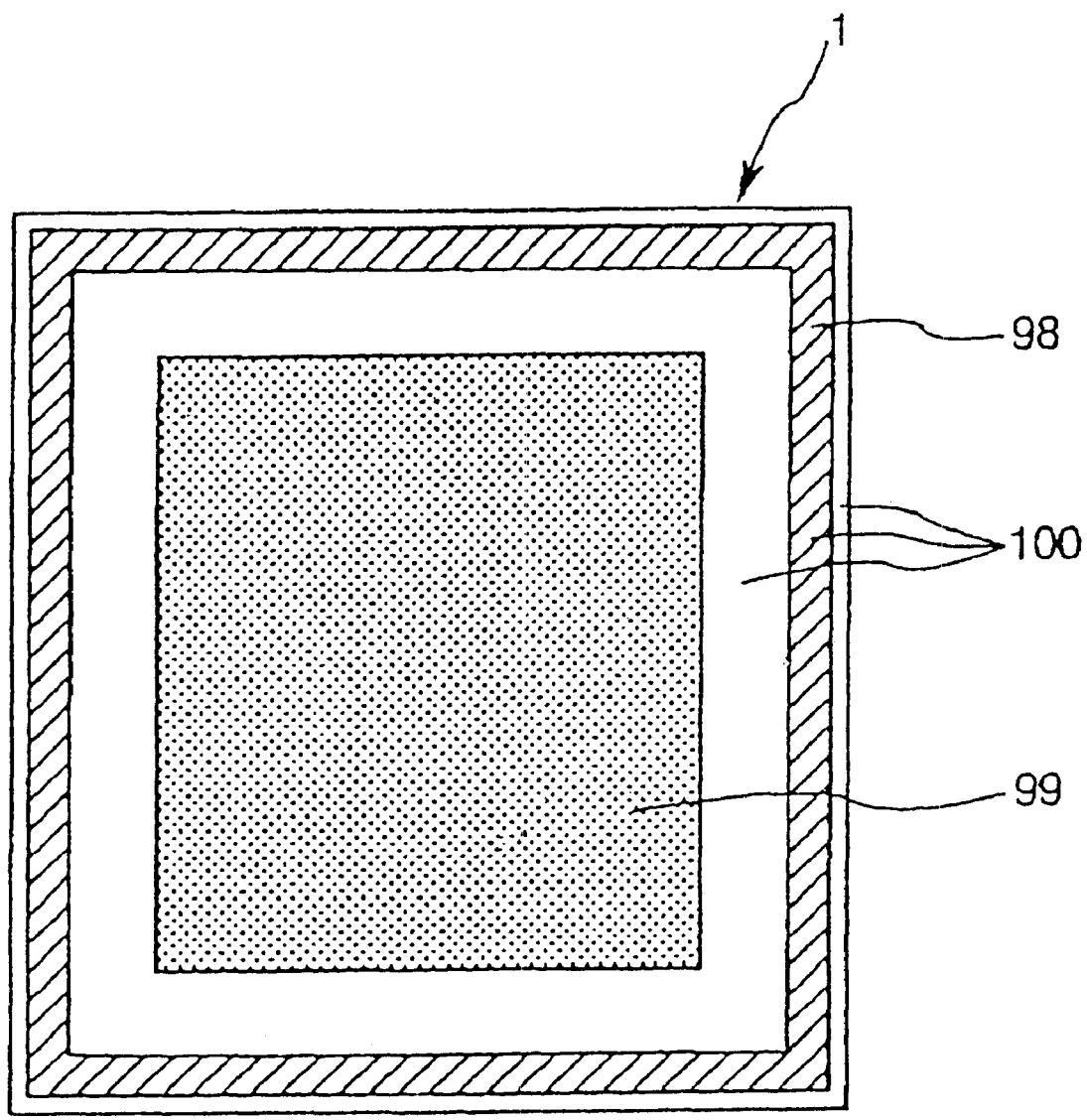
FIG. 2 is a plan view of the microlens substrate shown in FIG. 1.

FIG. 2 is a schematic plan view of the microlens substrate shown in FIG. 1. These drawings show an example of a microlens substrate being a substrate.

AS shown in FIG. 1, the microlens substrate 1 includes a transparent substrate (a first substrate) 2 provided thereon with a plurality (a number) of concavities (concavities for microlenses) 3, each having a concave surface, a resin layer 9 provided on a surface of the transparent substrate 2 provided thereon the concavities 3, an outer layer 8 provided on the resin layer 9, and spacers 5 for regulating the thickness of the resin layer 9. In the resin layer 9, microlenses 4 are formed with a resin filling the concavities 3.

As shown in FIG. 2, the shape in plan (the shape in plan view) of the microlens substrate 1 is, for example, rectangular (quadrilateral). A substantially rectangular (quadrilateral) effective lens-region 99 is formed at a central part of the microlens substrate 1. A non-effective lens-region 100 is formed outside the effective lens-region 99 so as to enclose the effective lens-region 99. The effective lens-region 99 is a region in which the microlenses 4 which are formed with the resin filling the concavities 3 effectively serve as microlenses when the microlenses 4 are used. The non-effective lens-region 100 is a region other than the effective lens-region 99 (a region outside the effective lens-region 99 of the example shown in the drawing).

The microlens substrate 1 is provided with the spacers 5 in the resin layer 9 in the non-effective lens-region 100, for regulating the thickness of the resin layer 9. The spacers 5 are formed with, for example, globules.

By providing the spacers 5 in the microlens substrate 1, the thickness of the resin layer 9 is easily regulated in a predetermined thickness value, and non-uniformity in the thickness of the resin layer 9 can be suppressed, as described below.

By providing the spacers 5 in the non-effective lens-region 100, that is, by providing the spacers 5 outside the effective lens-region 99, a risk of causing a problem, in that the spacers 5 intercept a path of light having passed through the microlenses 4, can be avoided. In other words, by providing the spacers 5 outside the effective lens region 99, a risk of deteriorating optical characteristics of the microlenses 4 can be avoided. Therefore, the optical characteristics of the microlenses 4 can be fully exhibited.

When spacers are formed in particles, as the spacers 5 according to the present example, the adhesion property between the resin layer 9 and the outer layer 8 is prevented from deteriorating. When spacers are formed in globules, as the spacers 5, the spacers are properly prevented from overlapping each other. Therefore, the thickness of the resin layer 9 can be regulated more accurately, and non-uniformity in the thickness of the resin layer 9 can be very appropriately avoided.

The average particle size of the spacers 5 can be set to substantially the same thickness as the resin layer 9. That is, the average particle size can be properly selected in accordance with the designed value of a thickness of the resin layer 9. Generally, the average particle size of the spacers 5 is preferably in the order of 0.1 to 100 $\mu$m, and more preferably in the order of 1 to 60 $\mu$m. When the average particle size is set to a value in the above ranges, the thickness of the resin layer 9 can be easily set so that emitted light passing through the microlenses 4 is focused in the vicinity of the surface of the microlens substrate 1, whereby the efficiency of light usage by using the microlens substrate 1 is improved.

The standard deviation of particle-size distribution of the spacers 5 is preferably not greater than 20%, and more preferably 5% or less, of the average particle size of the spacers 5, whereby non-uniformity in the thickness of the resin layer 9 is more appropriately suppressed.

The density of the spacers 5 is preferably set to a value in a range of 0.5 to 2.0 g/cm$^3$, and is more preferably set in the order of 0.7 to 1.5 g/cm$^3$. When the density of the spacers 5 is set to $\rho1$ (g/cm$^3$) and the density of a resin (for example, density after curing) forming the resin layer 9 is set to $\rho2$ (g/cm$^3$), a value $\rho1/\rho2$ is preferably in the order of 0.6 to 1.4, and more preferably in the order of 0.8 to 1.2, whereby an effect described below can be obtained.

Although in the microlens substrate 1, the spacers 5 are globules, the spacers 5 do not necessarily have globular shapes. The shape of each spacer formed in a particle may be, for example, a needle-shape, a rod-shape, an egg-shape, or elliptic. The spacer is not necessarily formed in a particle. The spacer may be, for example, sheet-like or fiber-like.

A region in which the spacers 5 are provided (disposed) is hereinafter conveniently referred to as a spacer-provided region 98.

In FIG. 2, the belt-shaped spacer-provided region 98 is formed in the vicinity of each side of the periphery of the quadrilateral microlens substrate 1. The spacer-provided region 98 is formed substantially in parallel to the respective adjacent sides.

By thus disposing the spacers 5 in the vicinity of edges of the microlens substrate 1, the spacers 5 can be very easily disposed without deteriorating the optical characteristics of the microlenses 4. "The vicinity of the edges of the microlens substrate" can be defined with respect to an intermediate part as a reference position between the individual edges (the periphery) of the microlens substrate and the center of the microlens substrate toward the edge sides.

Figure 3A:
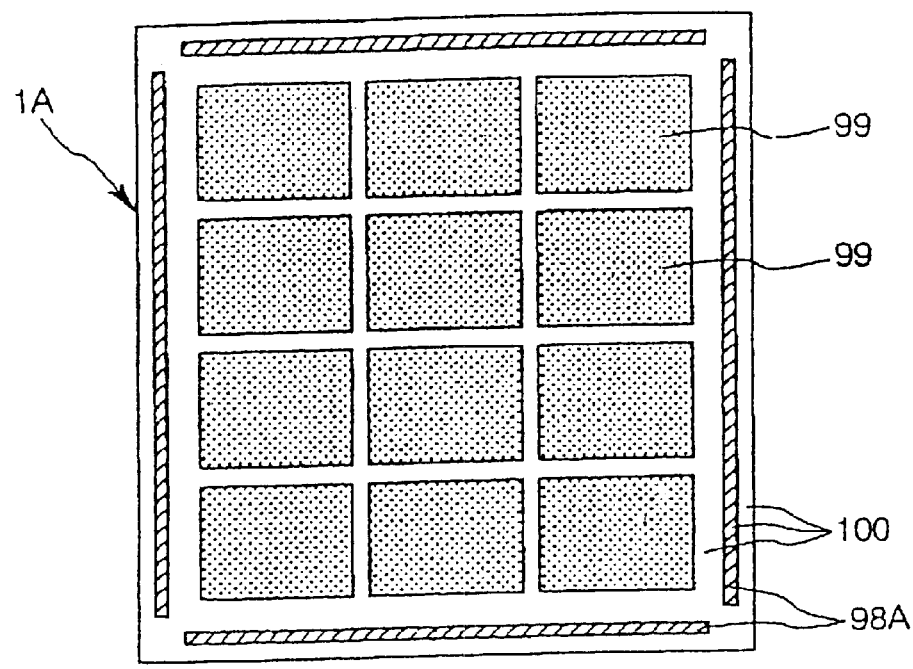
FIG. 3 includes schematic plan views for describing another example of the microlens substrate according to the present invention.
Figure 3B:
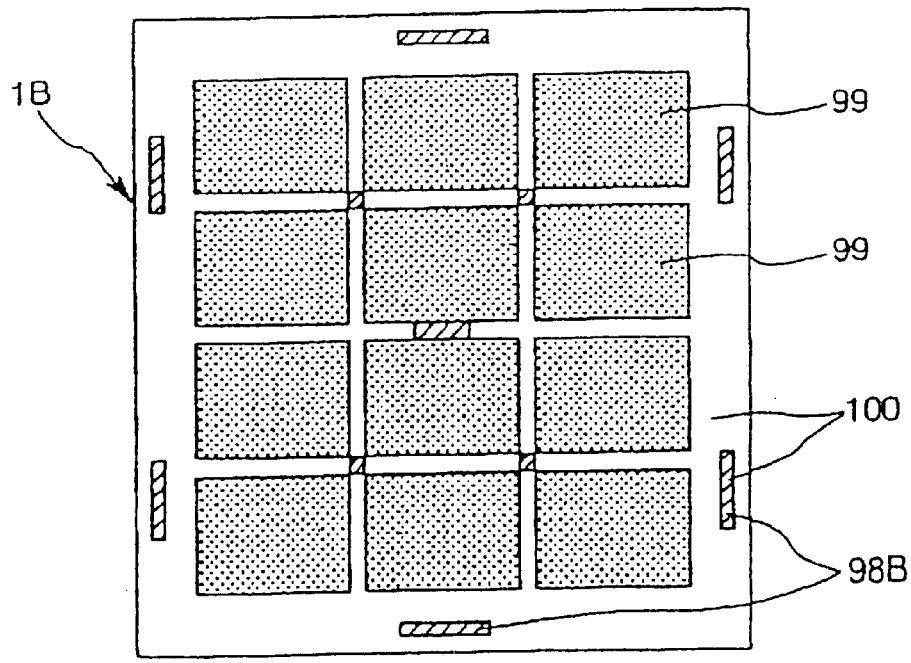
Figure 4:
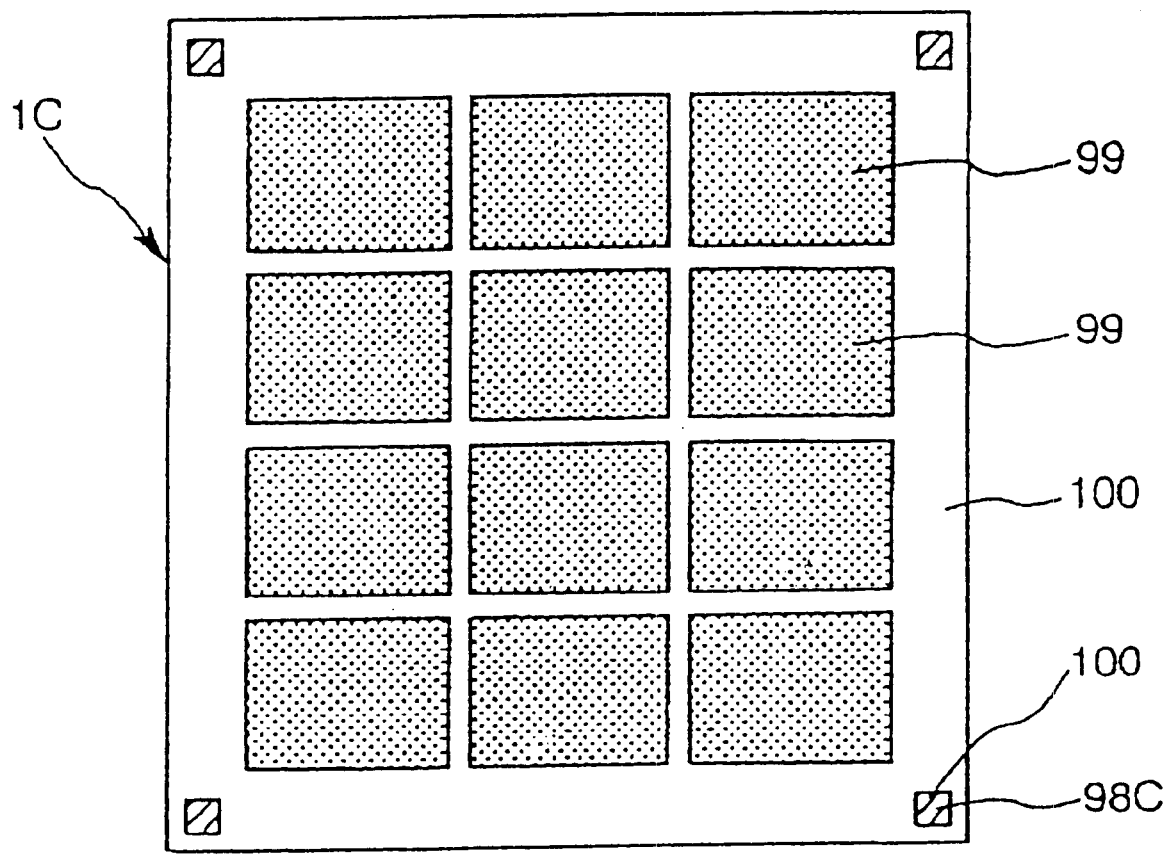
FIG. 4 is a schematic plan view for describing another example of the microlens substrate according to the present invention.

FIGS. 3 and 4 show other examples of patterns of disposing the spacers. These drawings show examples of the microlens substrate being wafers. The above microlens substrate 1 is provided with one continuous effective lens-region 99. On the other hand, in a microlens substrate 1A, 1B, or 1C, the substantially rectangular (quadrilateral) effective lens-region 99 is divided into a plurality so as to be formed in a lattice-shape in the non-effective lens-region 100. In other words, in the microlens substrate 1A, 1B, or 1C, a plurality of rectangular effective lens-regions 99 are formed in a matrix, and the belt-shaped non-effective lens-regions 100 are formed between the adjacent effective lens-regions 99.

The microlens substrate 1A shown in FIG. 3(*i*) is provided with belt-like spacer-provided regions 98A formed in the vicinity of the sides of the periphery of a quadrilateral of the microlens substrate 1A and in parallel to the respective adjacent sides.

By thus forming the spacers in a belt-shape, the thickness of the resin layer 9 can be regulated with very high accuracy, and non-uniformity in the thickness of the resin layer 9 can be very appropriately suppressed.

The microlens substrate 1B shown in FIG. 3(*ii*) is provided with the spacer-provided regions 98 formed in parts (in spots) in the vicinity of the sides of the periphery of the quadrilateral of the microlens substrate 1B. The microlens substrate 1B is also provided with the spacer-provided regions 98 between the adjacent effective lens-regions 99. Thus, the spacer-provided regions 98 may be disposed in portions in which the non-effective lens-regions 100 are formed in a belt-shape.

When the spacers are partly formed, the amount of the spacers can be reduced, manufacturing costs and the like can be reduced, and the thickness of the resin layer 9 can be accurately regulated.

The microlens substrate 1C shown in FIG. 4(*iii*) is provided with the spacer-provided regions 98 formed in parts (in spots) in the vicinity of the individual corners of the periphery of the quadrilateral of the microlens substrate 1C.

By partly forming the spacers in the vicinity of the individual corners, the amount of the spacers can be further reduced while the thickness of the resin layer 9 is regulated with relatively high accuracy.

When the spacer-provided regions 98 are formed so as not to come into contact with the effective lens-regions 99, that is, so as to be separated from the effective lens-regions 99, as in the case of the microlens substrate 1, 1A, or 1C, the spacers 5 are not likely to deteriorate the optical characteristics of the microlenses 4.

Although in the above examples of the microlens substrate, the spacers are disposed in the vicinity of four sides, the spacers are not necessarily disposed in the vicinity of the four sides. However, the spacers are preferably disposed in the vicinity of at least three sides, so that the thickness of the resin layer 9 can be properly regulated. The spacers are not necessarily disposed in the vicinity of the three sides. The spacers are not necessarily disposed in the vicinity of the edges of the microlens substrate.

In the microlens substrate 1 thus formed, the transparent substrate (glass substrate) 2 is made of, for example, glass. when the micro lens substrate 1 is used in a liquid crystal panel, and the liquid crystal panel includes a glass substrate (for example, a glass substrate 171 or the like described below) other than the transparent substrate 2, the thermal expansion coefficient of the transparent substrate 2 is preferably substantially the same as the thermal expansion coefficient of the other glass substrate included in the liquid crystal panel (the ratio between the two thermal expansion coefficients is, for example, in the order of $\frac{1}{10}$ to 10). The liquid crystal panel thus formed can be prevented from bent, deflection, separation, and the like which occur due to the difference in thermal expansion coefficient between the two substrates.

Accordingly, the transparent substrate 2 and other glass substrate which the liquid crystal panel includes are preferably made of the same material. With this arrangement, bent, deflection, separation, and the like, which occur due to the difference in thermal expansion when the temperature varies, can be efficiently avoided.

In particular, when the microlens substrate 1 is used in a TFT liquid crystal panel of a high-temperature polysilicon, the transparent substrate 2 is preferably made of silica glass. The TFT liquid crystal panel includes a TFT substrate as a liquid crystal driving substrate. Silica glass, of which characteristics are not likely to change due to environment when manufacturing, is preferably used in the TFT substrate. Therefore, by making the transparent substrate 2 of silica glass, a stable TFT liquid crystal panel can be obtained, in which bent, deflection, and the like are not likely to occur.

The thickness of the transparent substrate 2 differs in accordance with various conditions, such as a material of the transparent substrate 2, the index of refraction. Generally, the thickness is preferably in the order of 0.3 to 5 mm, and more preferably in the order of 0.5 to 2 mm. When the microlens substrate 1 is formed so that the light is applied from the resin layer 9 side and is emitted from the transparent substrate 2 side, the thickness of the transparent substrate 2 is preferably in the order of 10 to 1000 $\mu$m, and more preferably in the order of 20 to 150 $\mu$m.

The outer layer (glass layer) 8 may be made of, for example, glass. In this case, the thermal expansion coefficient of the outer layer 8 is preferably substantially the same as the thermal expansion coefficient of the transparent substrate 2 (for example, the ratio between the two thermal expansion coefficients is in the order of $\frac{1}{10}$ to 10). With this arrangement, bent, deflection, separation, and the like which occur due to the difference of thermal expansion coefficients between the transparent substrate 2 and the outer layer 8 can be avoided. Such effect can be obtained effectively by making the transparent substrate 2 and the outer layer 8 of the same material.

When the microlens substrate 1 is used in a liquid crystal panel, the thickness of the outer layer 8 is generally in the order of 5 to 1000 $\mu$m, and preferably in the order of 10 to 150 $\mu$m, so as to obtain necessary optical characteristics. When the liquid crystal panel is formed so that the light is applied from the outer layer 8 side, the thickness of the outer layer 8 is preferably in the order of 0.3 to 5 mm, and more preferably in the order of 0.5 to 2 mm.

The outer layer (barrier layer) 8 may be made of, for example, ceramics. The ceramics may be, for example, a nitride-based ceramics, such as AlN, SiN, TiN, or BN, an oxide-based ceramics, such as $Al_2O_3$ or $TiO_2$, or a carbide-based ceramics, such as WC, TiC, ZrC, or TaC. When the outer layer 8 is made of ceramics, the thickness of the outer layer 8 is not particularly specified. However, it is preferably in the order of 20 nm to 20 $\mu$m, and more preferably in the order of 40 nm to 1 $\mu$m. The outer layer 8 is not necessarily provided.

The resin layer (adhesive layer) 9 which covers the concavities 3 may be made of, for example, a resin (adhesive) having an index of refraction higher than the index of refraction of the material of the transparent substrate 2. For example, the resin layer 9 may be appropriately made of an ultraviolet curable resin, such as an acrylic resin, an epoxy resin, or an acrylic epoxy resin.

The thickness of the resin layer 9 (the thickness of an effective portion of the transparent substrate 2) is preferably in the order of 0.1 to 100 $\mu$m, and more preferably in the order of 1 to 20 $\mu$m.

The microlens substrate 1 can be manufactured by, for example, the following method.

When manufacturing the microlens substrate 1, the transparent substrate 2 provided with a plurality (a number) of the concavities 3 formed in a surface thereof (a substrate provided with concavities for microlenses) must be prepared. The transparent substrate 2 can be manufactured and be prepared in, for example, a manner described below (see FIG. 5).

As a base material, a green transparent substrate 2, for example, is prepared. A green transparent substrate, which has an even thickness and does not have deflection and scratches, is preferably used for the transparent substrate 2.

Figure 5A:
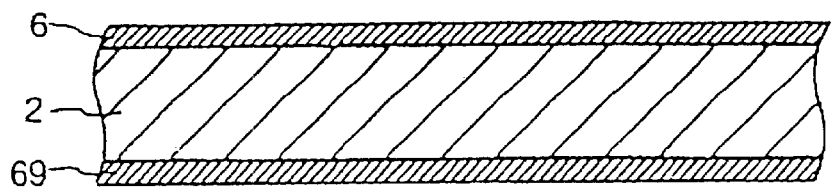
FIG. 5 includes illustrations for describing a method for manufacturing a microlens substrate, according to the present invention.

<1>A mask layer 6 is formed on a surface of the transparent substrate 2, as shown in FIG. 5(a). A rear-surface protection layer 69 is formed on a rear surface (the surface opposite to that which is provided with the mask layer 6) of the transparent substrate 2.

The mask layer 6 preferably has resistibility to an operation performed in the following process <3>.

Therefore, for example, metals, such as Au/Cr, Au/Ti, Pt/Cr, or Pt/Ti, silicon, such as polycrystalline silicon (polysilicon) or amorphous silicon, or a nitride-based silicon are used as a material for the mask layer 6.

The thickness of the mask layer 6 is not particularly specified. However, it is preferably in the order of 0.01 to 10 $\mu$m, and more preferably in the order of 0.2 to 1 $\mu$m. When the thickness is smaller than a lower limit value of the range, there is a risk of being unable to sufficiently protect the transparent substrate 2. When the thickness exceeds an upper limit value of the range, the mask layer 6 is likely to be separated due to an interior stress of the mask layer 6.

The mask layer 6 can be formed by, for example, a vapor-phase film deposition method, such as chemical vapor deposition (CVD), sputtering, or vapor deposition, or plating.

The rear-surface protection layer 69 serves to protect the rear surface of the transparent substrate 2 in the subsequent processes. The rear-surface protection layer 69 appropriately protects the transparent substrate 2 against erosion, deterioration, and the like at the rear surface thereof. The rear-surface protection layer 69 is made of the same material, for example, as the mask layer 6. Therefore, the rear-surface protection layer 69 may be formed simultaneously with the mask layer 6 and in the same fashion as the mask layer 6.

Figure 5B:
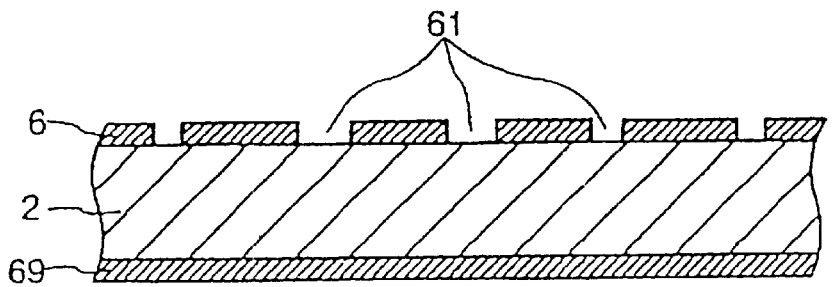

<2>Openings 61 are formed in the mask layer 6, as shown in FIG. 5(b).

The openings 61 are formed in positions in which the concavities 3 are formed. The shape of the openings 61 preferably corresponds to the shape (in plan view) of the concavities 3.

The openings 61 may be formed by, for example, photolithography. In particular, a resist layer (not shown) having a pattern corresponding to the openings 61 is formed on the mask layer 6. The mask layer 6 is partly removed by using the resist layer as a mask, and the resist layer is removed.

The mask layer 6 is partly removed by, for example, dry etching by a CF gas, a chlorine-based gas, or the like, or dipping in a stripping agent (wet etching) such as an aqueous solution of fluoric acid and nitric acid or an aqueous alkaline solution.

Figure 5C:
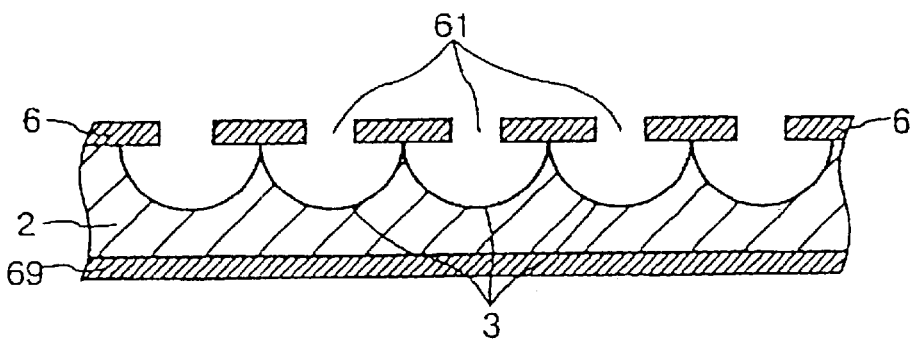

<3>In FIG. 5(c), the concavities 3 are formed in the transparent substrate 2.

The concavities 3 are formed by etching, such as dry etching or wet etching. By etching, for example, the transparent substrate 2 is etched in the same direction from the openings 61, whereby the concavities 3 having a lens-shape are formed. Particularly, by wet etching, the concavities 3 can be formed in a shape close to an idealistic lens-shape. For example, a fluoric-acid-based etching agent is appropriately used as an etching agent when wet-etching.

Figure 5D:
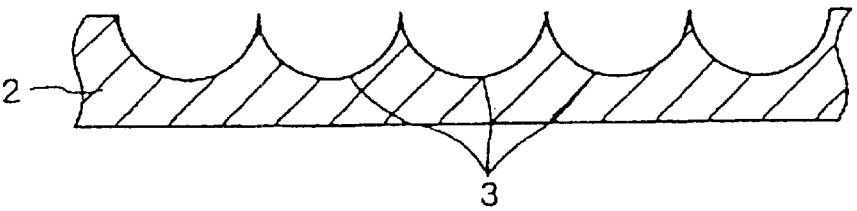

<4>As shown in FIG. 5(d), the mask layer 6 is removed. In this case, the rear-surface protection layer 69 is also removed when the mask layer 6 is removed.

The removal may be performed by, for example, dipping in a stripping agent (wet etching), such as an aqueous alkaline solution (for example, an aqueous solution of tetramethyl hydroxide ammonium), an aqueous solution of hydrochloric acid and nitric acid, or an aqueous solution of fluoric acid and nitric acid, or dry etching by a CF gas or a chlorine-based gas.

Thus, as shown in FIG. 5(d), the transparent substrate (substrate provided with concavities for microlenses) 2, which is provided with a plurality (a number) of the concavities 3 formed in a surface thereof, can be obtained.

By using the transparent substrate 2, the microlens substrate 1 is manufactured, for example, as described below.

Figure 6:
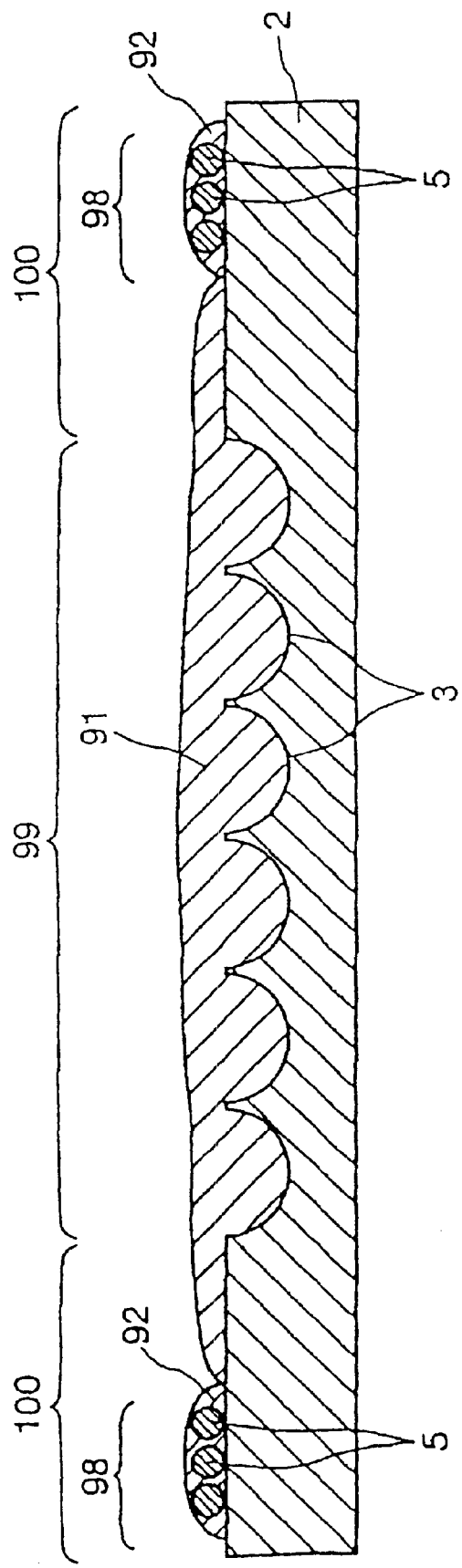
FIG. 6 is a schematic longitudinal-sectional view for describing the method for manufacturing a microlens substrate, according to the present invention.

<5>In FIG. 6, a resin 91 before curing, which has a predetermined index of refraction (in particular, index of refraction higher than that of the transparent substrate 2), is supplied onto the surface of the transparent substrate 2 provided with the concavities 3 formed therein so as to cover at least the effective lens-region 99, and the resin 91 fills the concavities 3. In this case, a resin 92 before curing including the spacers 5 is supplied onto the transparent substrate 2. The resin 92 is supplied on a portion in which the spacer-provided region 98 is to be formed.

The resin 92 may be supplied to the transparent substrate 2 before the resin 91 is supplied thereto or after the resin 91 is supplied thereto. The resin 92 may be supplied onto the transparent substrate 2 simultaneously with the resin 91.

The resin 91 and the resin 92 are preferably made of the same material, whereby bent, deflection, and the like occurring due to the difference of thermal expansion coefficients between the resin 91 and the resin 92 are appropriately avoided in the microlens substrate 1 to be manufactured. It is needless to say that the resin 91 and the resin 92 may be made of materials differing from each other.

When the resin 92 is supplied onto the transparent substrate 2, the spacers 5 are preferably dispersed in the resin 92. When the spacers 5 are dispersed in the resin 92, the spacers 5 can be disposed evenly in the spacer-provided region 98, whereby non-uniformity in the thickness of the resin layer 9 to be formed can be appropriately suppressed.

In particular, when the density of the spacers 5 is set to a value within the above-described range, the spacers 5 can be easily dispersed in the resin 92.

When the value $\rho1/\rho2$ is set to the range described above, the spacers 5 can be more evenly dispersed in the resin 92, whereby non-uniformity in the thickness of the. resin layer 9 can be more appropriately suppressed.

When the spacers are formed in particles, the spacers 5 can be easily dispersed in the resin 92. Particularly, when the spacers are formed in globules as the spacers 5, the spacers 5 are likely to be dispersed more evenly in the resin 92.

The resin 92 preferably contains 1 to 50 percent by weight and more preferably 5 to 40 percent by weight of the spacers 5. When the amount of the spacers 5 as a content is set in these ranges, the thickness of the resin layer 9 can be regulated with high accuracy while the adhesion property between the resin layer 9 and the outer layer 8 is prevented from deteriorating.

<6>Then, the resin 91 and the resin 92 are provided with the outer layer 8 (second substrate) made of glass disposed on the resin 91 and the resin 92 (the outer layer 8 is adhered closely to the resin), so that the outer layer 8 comes into contact with the spacers 5.

When the outer layer (opposing body) 8 is mounted, the distance between an end face of the outer layer 8 at the transparent substrate 2 side thereof and an end face of the transparent substrate 2 at the outer layer 8 side thereof is regulated by the spacers 5. The thickness of the resin layer 9 equals the distance between the end faces. Therefore, the thickness of the resin layer 9 can be set to a desired value by properly selecting the thickness of the spacer. Moreover, the thickness can be set with high accuracy.

When the spacers 5 are used, the distance between the end face of the outer layer 8 at the transparent substrate 2 side thereof and the end face of the transparent substrate 2 at the outer layer 8 side thereof becomes uniform over the microlens substrate 1. Therefore, the thickness of the resin layer 9 becomes uniform over the microlens substrate 1. When the thickness of the resin layer 9 is uniform, the focal distances of the microlenses 4 are the same as each other. Therefore, when the microlens substrate 1 is used in, for example, a liquid crystal panel, non-uniformity in the brightness of emitted light are reduced, thereby avoiding the non-uniformity in the brightness of images.

When the spacers 5 are used, it is not necessary to control pressing force and time for pressing the spacers 5 to the resin according to the type and viscosity of the resin. When the thickness of the resin layer was regulated only by controlling the pressing force and time for pressing the resin without using spacers, as in the known technology, most appropriate pressing force and time had to be looked for by way of tests whenever the type, the viscosity, or the like of the resin changed. On the other hand, when the spacers 5 are used, according to the present invention, it is not necessary to look for a most appropriate connection condition by way of tests even when the type, viscosity, or the like of the resin changes. Changes in the resin which forms the resin layer 9 can be coped with easily, according to the present invention, with minimum laborious work.

<7>The resin 91 and the resin 92 are cured, thereby forming the resin layer 9.

Thus, the outer layer 8 is bonded to the transparent substrate 2 via the resin layer 9. The microlenses 4 are formed in the concavities 3 with the resin forming the resin layer 9.

The resin is cured by, for example, applying an ultraviolet light or an electron beam to the resin, or heating the resin.

<8>Then, the thickness of the outer layer 8 may be adjusted by grinding, polishing, or the like.

Thus, the microlens substrate 1 shown in FIG. 1 can be obtained.

When the outer layer 8 is made of ceramics, the microlens substrate may be manufactured in the following way. Points differing from the above method of manufacturing the microlens substrate 1 are mainly described below.

The same processes <1>to <5>are performed. <6'>A mold (second substrate which is not shown) is disposed on the resin 91 and the resin 92 (the mold is pressed to the resins). In this case, the mold (opposing body) is disposed on the resins so that the mold comes into contact with the spacers 5.

The mold having a planar surface (a surface to be in contact with the resins) is appropriately used. <7'>The resin 91 and the resin 92 are cured so as to form the resin layer 9. <8'>The mold is removed from the resin layer 9, that is, mold release is performed. <9'>Then, the outer layer 8 made of ceramics is formed on the resin layer 9.

The outer layer 8 may be formed by, for example, sputtering, CDV, or vapor-phase film deposition such as vapor deposition.

Thus, the microlens substrate 1 including the outer layer 8 made of ceramics can be obtained.

The microlens substrate may be applied to various usages, such as a microlens substrate for CCD and a microlens substrate for an optical communication device, other than an opposing substrate for a liquid crystal panel and a liquid crystal panel which are described below.

Figure 7:
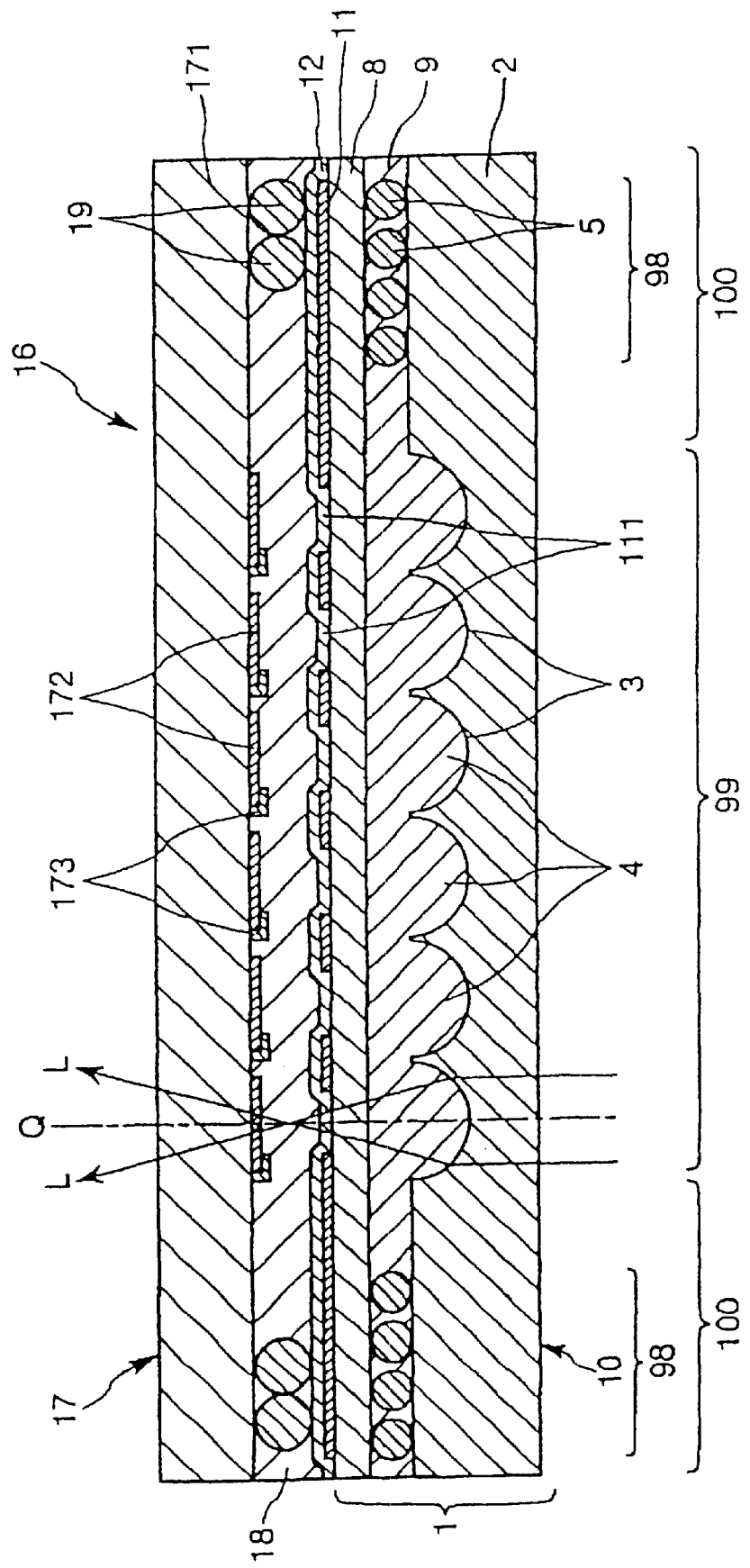
FIG. 7 is a schematic longitudinal-sectional view showing an example of a liquid crystal panel according to the present invention.

For example, a black matrix 11 having openings 111, as a light shielding film, is formed on the outer layer 8 of the microlens substrate 1, and a transparent conductive film 12 is formed so as to cover the black matrix 11, whereby an opposing substrate for a liquid crystal panel is manufactured (see FIG. 7).

The black matrix 11 and the transparent conductive film 12 may be provided on the transparent substrate 2 instead of the outer layer 8.

The black matrix 11 has a light shielding function, and made of, for example, a metal, such as Cr, Al, an Al-alloy, Ni, Zn, or Ti, or a resin containing carbon or titanium dispersed therein.

The transparent conductive film 12 is electrically conductive, and is made of, for example, indium tin oxide (ITO), indium oxide (IO), or tin oxide ($SnO_2$).

The black matrix 11 is formed in a manner such that, for example, a thin film to serve as the black matrix 11 is deposited on the outer layer by a vapor-phase film-deposition method (for example, vapor deposition, sputtering, or the like), a resist film is deposited on the thin film, the resist film having a pattern of the openings 111, the openings 111 are formed in the thin film by wet etching, and the resist film is removed.

The transparent conductive film 12 may be formed by a vapor-phase film deposition method, such as vapor deposition or sputtering.

Thus, an opposing substrate for a liquid crystal panel can be obtained by forming a black matrix and a transparent conductive film on the microlens substrate. When the microlens substrate is not provided with an outer layer, the black matrix and the transparent conductive film may be formed directly on the resin layer.

The black matrix 11 is not necessarily provided.

A liquid crystal panel (liquid crystal optical shutter) using the opposing substrate for a liquid crystal panel is described below with reference to FIG. 7.

In FIG. 7, a liquid crystal panel (TFT liquid crystal panel) 16 according to the present invention includes a TFT substrate (liquid crystal driving substrate) 17, an opposing substrate 10 for a liquid crystal panel connected to the TFT substrate 17, second spacers 19 for regulating the distance between the TFT substrate 17 and the opposing substrate 10 for a liquid crystal panel, and a liquid crystal layer 18 including liquid crystals sealed in a gap between the TFT substrate 17 and the opposing substrate 10 for a liquid crystal panel.

The opposing substrate 10 for a liquid crystal panel includes the microlens substrate 1, the black matrix 11 provided with the openings 111 and disposed on the outer layer 8 of the microlens substrate 1, and the transparent conductive film (common electrode) 12 disposed so as to cover the black matrix 11 on the outer layer 8.

The TFT substrate 17 is a substrate which drives the liquid crystals of the liquid crystal layer 18, and includes a glass substrate 171, a plurality (a number) of pixel electrodes 172 disposed on the glass substrate 171 in a matrix, and a plurality (a number) of thin-film transistors (TFT) 173 associating with the pixel electrodes 172, respectively. In the drawing, sealing materials, orientation films, wirings, and the like are omitted.

In the liquid crystal panel 16, the TFT substrate 17 and the opposing substrate 10 for a liquid crystal panel are bonded to each other at a predetermined distance therebetween and via the second spacers 19 so that the transparent conductive film 12 of the opposing substrate 10 for a liquid crystal panel opposes the pixel electrodes 172 of the TFT substrate 17. A surface of the TFT substrate 17 and a surface of the opposing substrate 10 for a liquid crystal panel, which oppose each other, are brought into contact with the second spacers 19.

The glass substrate 171 is preferably made of silica glass because of the above-described reason.

The pixel electrodes 172 drives the liquid crystals of the liquid crystal layer 18 by charging and discharging between the transparent conductive film (common electrode) 12. The pixel electrodes 172 are made of, for example, the same material as that of the transparent conductive film 12 described above.

The thin-film transistors 173 are connected to the adjacent and associating pixel electrodes 172. The thin-film transistors 173 are connected to a control circuit which is not shown, and control electrical current supplied to the pixel electrodes 172, thereby controlling the charge and discharge of the pixel electrodes 172.

The liquid crystal layer 18 contains liquid crystal molecules (not shown). The orientation of the liquid crystal molecules, that is, the orientation of the liquid crystals changes in accordance with the charge and discharge of the pixel electrodes 172.

In the liquid crystal panel 16, the spacers 5 included in the microlens substrate 1 preferably has properties (at least one of the properties, such as the modulus of elasticity, the hardness, the Poisson ratio, and the specific gravity) differing from those of the second spacers 19. The characteristics of the materials in contact with the spacers 5 and the second spacers 19, respectively, differ from each other. The spacers 5 and the second spacers 19 differ from each other in purpose and function. The manufacturing processes between the spacers 5 and the second spacers 19 are different. Therefore, when the properties between the spacers 5 and the second spacers 19 are different, the spacers having most appropriate characteristics can be individually disposed in accordance with the respective purposes, functions, rolls, and the like.

Particularly, the modulus of elasticity of the spacers 5 (the modulus of elasticity of the material forming the spacers 5) is preferably lower than the modulus of elasticity of the second spacers 19 (the modulus of elasticity of the material forming the second spacers 19), whereby uniformity in the thickness of the liquid crystal layer 18 of the liquid crystal panel 16 is improved. This is due to the following mechanism. In manufacturing the liquid crystal panel 16, the TFT substrate 17 and the opposing substrate 10 for a liquid crystal panel are connected to each other. In this case, the TFT substrate 17 is pressed by a force toward the opposing substrate 10 for a liquid crystal panel, and the opposing substrate 10 for a liquid crystal panel is pressed by the force toward the TFT substrate 17. The directions of the respective forces applied to the TFT substrate 17 and the opposing substrate 10 for a liquid crystal idealistically coincide completely with the normal lines to the substrates, respectively. However, the directions of the forces applied to the substrates are sometimes offset, even slightly, from the respective normal lines, as a practical matter. In this case, when the modulus of elasticity of the spacers 5 is lower than the modulus of elasticity of the second spacers 19, the spacers 5 is contracted and the contraction of the second spacers 19 is suppressed. As a result, the uniformity in the thickness of the liquid crystal layer 18 is prevented from lowering. When the uniformity in the thickness of the liquid crystal layer 18 is high, images having a very high uniformity in contrast ratio can be obtained over the liquid crystal panel, and an advantage can be obtained in that visual perceptibility is improved.

In order to obtain a more remarkable effect, the modulus of elasticity of the material of the spacers 5 is preferably in the order of 40 to 800 kgf/mm$^2$, although it slightly varies according to the characteristics of the second spacers 19 and the others.

Generally, in the liquid crystal panel 16, one pixel associates with one microlens 4, one opening 111 of the black matrix 11, corresponding to an optical axis Q of the microlens 4, one pixel electrode 172, and one thin-film transistor 173 connected to the pixel electrode 172.

An incident light L applied to the opposing substrate 10 for a liquid crystal panel passes through the transparent substrate 2, is condensed by the microlens 4, and is transmitted through the resin layer 9, the outer layer 8, the opening 111 of the black matrix 11, the transparent conductive film 12, the liquid crystal layer 18, the pixel electrode 172, and the glass substrate 171. Since a polarizer (not shown) is generally provided at the incidence side of the microlens substrate 1, the incident light L has been converted into a linear polarized light when the incident light L is transmitted by the liquid crystal layer 18. In this case, the polarization direction of the incident light L is controlled in accordance with the orientated state of liquid crystal molecules of the liquid crystal layer 18. Therefore, the luminance of an emitted light can be controlled by applying the incident light L having been transmitted through the liquid crystal panel 16 to a polarizer (not shown).

Thus, the liquid crystal panel 16 includes the microlenses 4, and the incident light L passing each microlens 4 is condensed and passes each opening 111 of the black matrix 11. The incident light L is shielded in a region in which the openings 111 of the black matrix 11 are not formed. Therefore, in the liquid crystal panel 16, unnecessary light is prevented from leaking from the region other than that which is provided with the pixels, and the attenuation of the incident light L to the pixel region is suppressed. Therefore, the liquid crystal panel 16 has a high transmissivity at the pixels, and can form bright and clear images with a relatively small light amount.

Since non-uniformity in the thickness of the resin layer 9 of the microlens substrate 1 is avoided, the non-uniformity in the brightness of images can be appropriately avoided.

The liquid crystal panel 16 can be manufactured in a manner such that, for example, the TFT substrate 17 and the opposing substrate 10 for a liquid crystal panel individually manufactured by known methods and orientation-processed are bonded to each other via the second spacers 19 and a sealing material (not shown), liquid crystals are injected into a gap thus formed through an injection hole (not shown) communicating with the gap, and the injection hole is closed. Polarizers may be bonded, as needed, at the incidence side and the emission side, respectively, of the liquid crystal panel 16.

Although in the above liquid crystal panel 16, the TFT substrate is used as a liquid crystal driving substrate, other liquid crystal driving substrates, such as a TFD substrate and a STN substrate, may be used instead of the TFT substrate.

A projection display apparatus (liquid crystal projector) using the liquid crystal panel 16 is described below.

Figure 8:
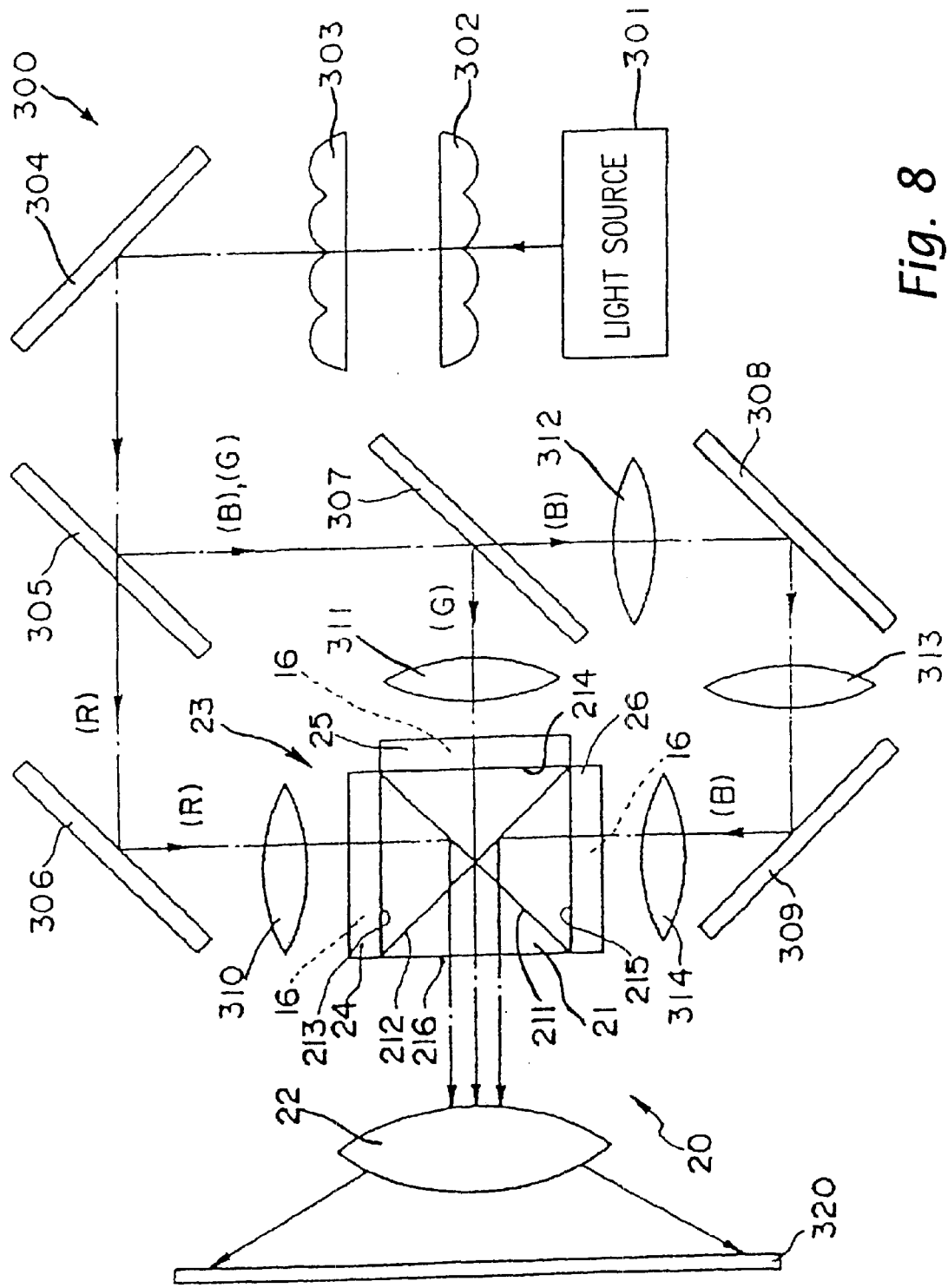
FIG. 8 is a schematic illustration showing an optical system of a projection display apparatus according to the example of the present invention.
Figure 9:
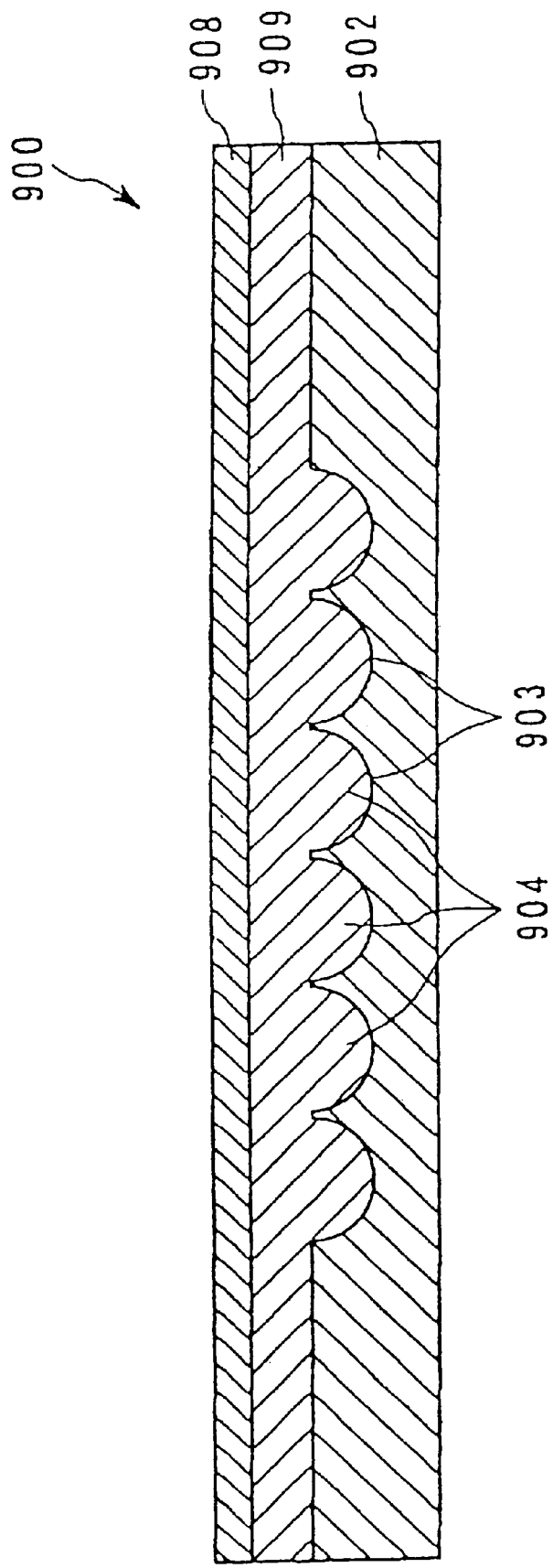
FIG. 9 is a longitudinal-sectional view of a known microlens substrate.

FIG. 8 is a schematic drawing showing an optical system of a projection display apparatus according to the present invention.

In the drawing, a projection display apparatus 300 includes a light source 301, an illumination optical system provided with a plurality of integrator lenses, a color-splitting optical system (light-guiding optical system) provided with a plurality of dichroic mirrors and the like, a liquid crystal light valve (liquid crystal light shutter array) 24 associating with red (for red), a liquid crystal light valve (liquid crystal light shutter array) 25 associating with green (for green), a liquid crystal light valve (liquid crystal light shutter array) 26 associating with blue (for blue), a dichroic prism (color-resynthesizing optical system) 21 including a dichroic mirror 211 for reflecting only red light and a dichroic mirror 212 for reflecting only blue light, and a projection lens (projection optical system) 22.

The illumination optical system includes integrator lenses 302 and 303. The color-splitting optical system includes mirrors 304, 306, and 309, a dichroic mirror 305 for reflecting blue light and green light (transmitting only red light), a dichroic mirror 307 for reflecting only green light, a dichroic mirror 308 for reflecting only blue light (or a mirror for reflecting only blue light), and condenser lenses 310, 311, 312, 313, and 314.

The liquid crystal light valve 25 includes the above liquid crystal panel 16, a first polarizer (not shown) connected to the incidence side of the liquid crystal panel 16 (the side at which the microlens substrate is disposed, that is, the side opposite to the dichroic prism 21), and a second polarizer (not shown) connected to the emission side of the liquid crystal panel 16 (the side opposite to the microlens substrate, that is, the side of the dichroic prism 21). The liquid crystal light valves 24 and 26 have the same configuration as that of the liquid crystal light valve 25. The liquid crystal panels 16 included in the individual liquid crystal light valves 24, 25, and 26 are connected, respectively, to a driving circuit which is not shown.

In the projection display apparatus 300, the dichroic prism 21 and the projection lens 22 form an optical block 20. The optical block 20, and the liquid crystal light valves 24, 25, and 26 fixed to the dichroic prism 21 form a display unit 23.

The operation of the projection display apparatus 300 is described below.

White light beams (white light fluxes) emitted by the light source 301 are transmitted by the integrator lenses 302 and 303. The optical strength (luminance distribution) of the white light beams is made even by the integrator lenses 302 and 303.

The white light beams transmitted by the integrator lenses 302 and 303 are reflected to the left in FIG. 8 by the mirror 304. Blue light beams (B) and green light beams (G) of the reflected light beams are reflected downwardly in FIG. 8 by the dichroic mirror 305, and red light beams (R) are transmitted by the dichroic mirror 305.

The red light beams transmitted by the dichroic mirror 305 are reflected downwardly in FIG. 8 by the mirror 306. The reflected light beams are condensed by the condenser lens 310 and are applied to the liquid crystal light valve 24 for red.

The Green light beams of the blue light beams and the green light beams reflected to the left in FIG. 8 by the dichroic mirror 305, and the blue light beams are transmitted by the dichroic mirror 307.

The green light beams reflected by the dichroic mirror 307 are condensed by the condenser lens 311 and are applied to the liquid crystal light valve 25 for green.

The blue light beams transmitted by the dichroic mirror 307 are reflected to the left in FIG. 8 by the dichroic mirror (or the mirror) 308, and the reflected light beams are reflected upwardly in FIG. 8 by the mirror 309. The blue light beams are condensed by the condenser lenses 312, 313, and 314, and are applied to the liquid crystal light valve 26 for blue.

Thus, the white light beams emitted by the light source 301 are split into three primary colors of red, green, and blue by the color-splitting optical system, and are guided and applied to the corresponding liquid crystal light valves.

The pixels (the thin film transistors 173 and the pixel electrodes 172 connected thereto) of the liquid crystal panel 16 included in the liquid crystal light valve 24 are switch-controlled (on-off-controlled), that is, are modulated by a driving circuit (driving unit) which operates in accordance with an image signal for red.

In the same fashion, the green light beams and the blue light beams are applied to the liquid crystal light valves 25 and 26, respectively, and are modulated by the liquid crystal panels 16 included in the individual liquid crystal light valves, thereby forming images for green and blue, respectively. In this case, the pixels of the liquid crystal panel 16 included in the liquid crystal light valve 25 are switch-controlled by a driving circuit which operates in accordance with an image signal for green. The pixels of the liquid crystal panel 16 included in the liquid crystal light valve 26 are switch-controlled by a driving circuit which operates in accordance with an image signal for blue.

Thus, the red, green, and blue light beams are modulated by the liquid crystal light valves 24, 25, 26, respectively, and images for red, green, and blue are formed, respectively.

The image for red formed by the liquid crystal light valve 24, that is, the red light beams from the liquid crystal light valve 24 are applied to the dichroic prism 21 at a surface 213 and are reflected to the left in FIG. 8 by the dichroic mirror 211, are transmitted by the dichroic mirror 212, and are emitted from an emitting surface 216.

The image for green formed by the liquid crystal light valve 25, that is, the green light beams from the liquid crystal light valve 25 are applied to the dichroic prism 21 at a surface 214, are transmitted by the dichroic mirrors 211 and 212, and are emitted from an emitting surface 216.

The image for blue formed by the liquid crystal light valve 26, that is, the blue light beams from the liquid crystal light valve 26 are applied to the dichroic prism 21 at a surface 215 and are reflected to the left in FIG. 8 by the dichroic mirror 212, are transmitted by the dichroic mirror 211, and are emitted from an emitting surface 216.

The colored light beams from the respective liquid crystal light valves 24, 25, and 26, that is, the images formed by the liquid crystal light valves 24, 25, and 26, respectively, are synthesized again by the dichroic prism 21, whereby colored images are formed. The images are projected (enlarged and projected) on a screen 320 disposed in a predetermined position by the projection lens 22.

EXAMPLES

Example 1

A microlens substrate was manufactured, as described below. The thickness of a resin layer was designed so as to be set to 12 $\mu$m.

A green rectangular silica-glass substrate (transparent substrate) having a thickness of 1.2 mm was prepared as a base material. The silica-glass substrate was dipped in a cleaning agent (a mixture of sulfuric acid and an aqueous solution of hydrogen peroxide) so as to be cleaned, and was cleaned at the surfaces thereof.

-1- A polycrystalline silicon film having a thickness of 0.4 $\mu$m was deposited by a CVD method on front and rear surfaces of the silica-glass substrate.

The deposition was performed by supplying $SiH_4$ at a speed of 300 ml/minute to a CVD furnace which was set to 600° C. and 80 Pa, in which the silica-glass substrate was placed.

-2- Openings associating with the concavities to be formed were formed in the polycrystalline silicon film.

The process was performed in a manner such that a resist layer having a pattern of the concavities to be formed was formed on the polycrystalline silicon film, dry etching by a CF gas was performed on the polycrystalline silicon film, thereby forming openings, and the resist layer was removed.

-3- The silica-glass substrate was dipped in an etching agent (an aqueous solution containing a mixture of 10% of fluoric acid and 10% of glycerin) so as to perform wet-etching thereon, and the concavities were formed in the silica glass substrate.

-4- The silica-glass substrate was dipped in an aqueous solution of 15% tetramethyl hydroxide ammonium, and the polycrystalline silicon film deposited on the front and rear surfaces was removed.

-5.1- An ultraviolet (UV) curable acrylic optical adhesive before curing (index of refraction: 1.60, density after curing: 1.18 g/CM$^3$) was applied, by using a dispenser while removing air bubbles, to the silica-glass substrate in a region of the surface provided with the concavities, and outside the spacer-provided region.

-5.2- An adhesive, in which spacers were evenly dispersed, was applied to the silica-glass substrate in a region not provided with the concavities by using a dispenser and in an application pattern shown in FIG. 2.

The same adhesive as that used in the above process -5.1- was used in this process. The amount of the spacers as a content in the adhesive was 10 wt %. Globular plastic particles were used as the spacers. The average particle size of the globular plastic particles was 12 $\mu$m. The standard deviation of the particle-size distribution was 4.6% of the average particle size. The density was 1.19 g/cm$^3$. The modulus of elasticity was 480 kgf/mm$^2$.

-6- A cover glass (outer layer) made of silica glass was bonded to the surface on which a resin had been applied. In this case, a pressure was applied evenly to the overall cover glass so that the cover glass was brought into contact with the spacers in the overall spacer-provided region.

-7- An ultraviolet light was applied, whereby the resin was cured, and the resin layer and the microlenses were formed.

-8- Lastly, the cover glass was ground and polished so that the thickness thereof became 50 $\mu$m, whereby the microlens substrate having a configuration shown in FIGS. 1 and 2 was obtained.

Example 2

In the same fashion as described above, a wafer-shaped microlens substrate shown in FIG. 3(*i*) was manufactured.

Example 3

In the same fashion as described above, a wafer-shaped microlens substrate shown in FIG. 3(*ii*) was manufactured.

Example 4

In the same fashion as described above, a wafer-shaped microlens substrate shown in FIG. 4(*iii*) was manufactured.

Comparative Example

A microlens substrate was manufactured in the same manner as those which are described in the above examples except for those which are described below.

The same processes -1- to -4- were performed.

-C5- An adhesive before curing which did not contain spacers, was applied to the silica glass substrate in a region which was provided with the concavities formed therein.

-C6- A cover glass made of silica glass was bonded to the silica-glass substrate on the surface thereof to which a resin had been applied. In this case, a pressure was applied to the overall cover glass, whereby the distance of end surfaces opposing each other between the silica-glass substrate and the cover glass was controlled so that the thickness of the resin layer became 12 $\mu$m.

Then, the same processes -7- and -8- were performed.

(Evaluation)

Portions in the vicinity of corners disposed in the non-effective lens-regions of the microlens substrates obtained in the above examples and comparative example were individually divided in meshes of 7 lines and 5 rows, each being 20 mm square. The thickness of the resin layer in each mesh was measured by using a liquid crystal gap- measuring device ("TM-1230N" made by Canon Inc.), and the average thickness and the standard deviation of the thickness of each of 35 pieces of the obtained resin layers were obtained.

The result was as follows.

Example 1 . . . Average thickness: 11.960 $\mu$m Standard deviation: 1.354 $\mu$m Example 2 . . . Average thickness: 11.952 $\mu$m Standard deviation: 1.376 $\mu$m Example 3 . . . Average thickness: 12.086 $\mu$m Standard deviation: 1.128 $\mu$m Example 4 . . . Average thickness: 12.093 $\mu$m Standard deviation: 1.280 $\mu$m Comparative example . . . Average thickness: 14.041 $\mu$m Standard deviation: 3.452 $\mu$m From the result described above, it was confirmed that the thickness of the resin layer of the microlens substrate according to the present examples was very close to a designed value (12 $\mu$m). It was also confirmed that non-uniformity in the thickness of the resin layer had been appropriately suppressed.

In each of the microlens substrates manufactured in the examples, a light shielding film (Cr film), that is, a black matrix having a thickness of 0.16 $\mu$m and provided with openings formed in positions associating with the microlenses of the cover glass was formed by a sputtering method and a photolithographic method. On the black matrix, an ITO film (transparent conductive film) having a thickness of 0.15 $\mu$m was formed by a sputtering method, whereby an opposing substrate for a liquid crystal panel was manufactured. Then, the opposing substrate for a liquid crystal panel was divided into a plurality of opposing substrates for liquid crystal panels when the opposing substrate for a liquid crystal panel was formed in a wafer-shape.

The opposing substrate for a liquid crystal panel thus formed and the TFT substrate (the glass substrate was made of silica glass) prepared separately were orientation-processed, and were bonded to each other via spacers (the modulus of elasticity: 7454 kgf/mm$^2$) including globular silica particles and a sealing material. Then, liquid crystals were injected into a gap formed between the opposing substrate for a liquid crystal panel and the TFT substrate through an injection hole to the gap, and the injection hole was closed, whereby a TFT liquid crystal panel shown in FIG. 7 was manufactured. Light was applied to the obtained TFT, and non-uniformity in the brightness of emitted light between each pixel was not noticed.

The obtained TFT liquid crystal panels were assembled to form a liquid crystal projector (projection display apparatus) having a configuration shown in FIG. 8. As a result, the obtained liquid crystal projector could project images on a screen, which had not non-uniformity in brightness.

A microlens substrate including an outer layer made of ceramics was manufactured. In such a microlens substrate, the resin layer could be formed so as to have a thickness substantially in a designed value. Non-uniformity in the thickness of the resin layer was reduced. The microlens substrate was manufactured in the same fashion as in example 1 except for that the average particle size of the spacers was set to 40 μm; in process -6-, a mold applied with a mold-releasing agent thereon was bonded to the resin instead of providing a cover glass; the mold was removed from the resin after the resin was cured; and an AlN film having a thickness of 1 μm was formed on the resin layer by sputtering.

According to the present invention, as described above, a microlens substrate of which the thickness of the resin layer can be regulated with high accuracy can be provided. The resin layer can be made so as to have a thickness closer to a designed value, according to the present invention. Therefore, the optical characteristics of the microlenses become closer to designed values.

According to the present invention, non-uniformity in the thickness of the resin layer can be suppressed. Therefore, the non-uniformity in the brightness of emitted light transmitted by the microlenses can be suppressed.

According to the present invention, a liquid crystal panel and a projection display apparatus can be provided, which can project images without non-uniformity in the brightness.

What is claimed is:

1. A method for manufacturing a microlens substrate comprising the steps of:

supplying a resin onto a first substrate provided thereon with a plurality of concavities;

disposing the first substrate and a second substrate via the resin therebetween; and forming microlenses with the resin filling the concavities, wherein the first substrate and the second substrate are bonded to each other by providing a resin including a spacer to be disposed outside a region in which the concavities are formed.

2. A method for manufacturing a microlens substrate, according to claim 1, wherein the resin for forming the microlenses and the resin including the spacer include the same material.

3. A method for manufacturing a microlens substrate, according to claim 1, wherein the spacer includes a plurality of particles.

4. A method for manufacturing a microlens substrate, according to claim 1, wherein the spacer includes a plurality of globular particles.

5. A method for manufacturing a microlens substrate, according to claim 1, wherein the resin including the spacer contains 1 to 50 percent by weight of the spacer.

6. A method for manufacturing a microlens substrate, according to claim 1, wherein the second substrate is made of glass.

7. A microlens substrate manufactured by a method for manufacturing a microlens substrate, according to claim 1.

8. A microlens substrate comprising:

a first substrate provided thereon with a plurality of concavities;

a resin layer provided so as to cover the concavities; and microlenses formed with a resin filling the concavities, wherein a spacer for regulating the thickness of the resin layer is provided outside an effective lens-region including the microlenses.

9. A microlens substrate according to claim 8, wherein the spacer is provided in the vicinity of an edge of the microlens substrate.

10. A microlens substrate according to claim 8, wherein the microlens substrate is substantially quadrilateral and the spacer is provided in the vicinity of at least three sides of the quadrilateral.

11. A microlens substrate according to claim 8, wherein the spacer includes a plurality of particles.

12. A microlens substrate according to claim 8, wherein the spacer includes a plurality of globular particles.

13. A microlens substrate according to claim 12, wherein the standard deviation of particle-size distribution of the spacer is not greater than 20 percent of an average particle-size of the spacer.

14. A microlens substrate according to claim 8, wherein the density of the spacer is 0.5 to 2.0 g/cm$^3$.

15. A microlens substrate according to claim 8, wherein a value $\rho 1/\rho 2$ is 0.6 to 1.4, in which $\rho 1$ denotes the density (g/cm$^3$) of the spacer and $\rho 2$ denotes the density (g/cm$^3$) of the resin forming the resin layer.

16. A microlens substrate according to claim 8, wherein an outer layer is provided on the resin layer.

17. A microlens substrate according to claim 16, wherein the outer layer is made of glass or ceramics.

18. A microlens substrate comprising:

a plurality of concavities on a first substrate;

a first resin dispersed over said concavities on said first substrate forming microlenses;

a plurality of spacers dispersed in a second resin disposed peripherally to said concavities; and a second substrate disposed adjacent to said first substrate by said second resin.

19. The microlens substrate according to claim 18, wherein the spacer is formed of a plurality of particles.

20. The microlens substrate according to claim 18, wherein the spacer is formed of a plurality of globules.

21. The microlens substrate according to claim 18, wherein the second resin contains 1 to 50% by weight of the spacers.

22. The microlens substrate according to claim 18, wherein the first and second resins further comprise the same resin.

23. The microlens substrate according to claim 18, wherein the microlens substrate further comprises a plurality of wafers.

24. The microlens substrate according to claim 18, wherein the first substrate further comprises glass.

25. The microlens substrate according to claim 18, wherein the second substrate further comprises glass.

26. The microlens substrate according to claim 18, wherein the second substrate further comprises ceramic.

27. The microlens substrate according to claim 18, wherein the average particle size of the spacer is about 0.1 to about 100 μm.

* * * * *

UNITED STATES PATENT AND TRADEMARK OFFICE
CERTIFICATE OF CORRECTION

PATENT NO. : 6,469,832 B2  
DATED : October 22, 2002  
INVENTOR(S) : Shinichi Yotsuya et al.

It is certified that error appears in the above-identified patent and that said Letters Patent is hereby corrected as shown below:

<u>Title page,</u>  
Item [56], References Cited, Patent No. "6,129,866", "Hmanaka" should be -- Hamanaka et al --

<u>Column 1,</u>  
Line 26, "microleins;" should be -- microlens --  
Line 28, "show n" should be -- shown --

<u>Column 2,</u>  
Line 66, "AS" should be -- As --

<u>Column 16,</u>  
Line 64, "not" should be -- no --

Signed and Sealed this

Eighth Day of April, 2003

JAMES E. ROGAN  
*Director of the United States Patent and Trademark Office*